(12) United States Patent
Ihm et al.

(10) Patent No.: US 7,564,831 B2
(45) Date of Patent: Jul. 21, 2009

(54) METHOD OF TRANSMITTING FEEDBACK INFORMATION USING AN EXTENDED SUBHEADER

(75) Inventors: Bin Chul Ihm, Anyang-si (KR); Jin Young Chun, Seoul (KR); Yong Suk Jin, Anyang-si (KR)

(73) Assignee: LG Electronics, Inc., Seoul (KR)

( * ) Notice: Subject to any disclaimer, the term of this patent is extended or adjusted under 35 U.S.C. 154(b) by 346 days.

(21) Appl. No.: 11/320,381

(22) Filed: Dec. 27, 2005

(65) Prior Publication Data

US 2006/0171417 A1  Aug. 3, 2006

Related U.S. Application Data

(60) Provisional application No. 60/663,347, filed on Mar. 17, 2005.

(30) Foreign Application Priority Data

Dec. 27, 2004 (KR) ............. 10-2004-0112927
Jan. 5, 2005 (KR) ............. 10-2005-000930

(51) Int. Cl.
*H04J 3/24* (2006.01)

(52) U.S. Cl. .............. 370/349; 370/389; 370/393; 370/394

(58) Field of Classification Search ............. 455/68, 455/69; 370/349
See application file for complete search history.

(56) References Cited

U.S. PATENT DOCUMENTS

| 6,594,251 B1 | 7/2003 | Raissinia et al. |
| 6,615,382 B1 | 9/2003 | Kang et al. |
| 2008/0069031 A1 | 3/2008 | Zhang et al. |

OTHER PUBLICATIONS

IEEE Standard for Local and metropolitan area networks, IEEE Std 802.16—Oct. 1, 2004.*
Zivan Ori, Yigal Eliaspur, Mary Chio, Yongseok Jin, Mo-Han Fong, Generic Sleep Corrections, Jan. 27, 2005, IEEE 802.16 Broadband Wireless Access Working Group.*
Balachandran, K. et al. "Medium Access Control and Radio Resource Management for Packet Data Services over IS-136 Channels" 1999 IEEE 49th Vehicular Technology Conference, Jul. 1999.

* cited by examiner

*Primary Examiner*—Nick Corsaro
*Assistant Examiner*—Vladimir Magloire
(74) *Attorney, Agent, or Firm*—Lee, Hong, Degerman, Kang & Waimey

(57) ABSTRACT

A method of transmitting feedback information is disclosed. More specifically, a mobile station (MS) receives a Protocol Data Unit (PDU) which includes a Medium Access Channel (MAC) header from a base station (BS). Thereafter, the MS determines from the received MAC header whether an extended subheader group appears after the MAC header, and also identifies a feedback request extended subheader from the extended subheader group. Lastly, the MS transmits the feedback information according to the feedback request extended subheader.

22 Claims, 9 Drawing Sheets

METHOD OF TRANSMITTING FEEDBACK INFORMATION USING AN EXTENDED SUBHEADER

This application claims the benefit of earlier filing date and right of priority to Korean Application No. 10-2004-112927, filed on Dec. 27, 2004, Korean Application No. 10-2005-000930, filed on Jan. 5, 2005, and U.S. Provisional Application No. 60/663,347 filed on Mar. 17, 2005, which are hereby incorporated by reference.

BACKGROUND OF THE INVENTION

1. Field of the Invention

The present invention relates to a method of transmitting feedback information, and more particularly, to a method of transmitting feedback information using an extended subheader.

2. Discussion of the Related Art

FIG. 1 is an example illustrating a structure of a Medium Access Control (MAC) Protocol Data Unit (PDU). As illustrated in FIG. 1, the MAC Management PDU includes a MAC Header 11, a Management Message Type 12, and a MAC Management Payload 13. Furthermore, a Bandwidth Request PDU is used by each user to dynamically request a necessary bandwidth for transmitting uplink data. The Bandwidth Request PDU is special in that it only includes the bandwidth request header and nothing else including a payload.

FIG. 2 illustrates a structure of the MAC PDU of FIG. 1. More specifically, if a MAC PDU is formed without packing or fragmenting a MAC Service Data Unit (SDU), as illustrated in FIG. 2, a MAC PDU does not included a packing subheader or a fragmentation subheader.

FIG. 3 illustrates another example of a structure of a MAC PDU. As illustrated in FIG. 3, a MAC SDU 31 is fragmented to be included in forming two or more MAC PDUs 30a and 30b. In forming the MAC PDUs 30a and 30b, fragmentation subheaders 34a and 34b are attached behind the MAC headers 33a and 33b, respectively. Moreover, MAC SDUs 35a and 35b are attached behind the fragmentation subheaders 34a and 34b, respectively, to form MAC PDUs 30a and 30b.

FIG. 4 is yet another example illustrating a structure of a MAC PDU. In FIG. 4, a MAC PDU is formed by packing two or more MAC SDUs (e.g., MAC SDU #1 41a and MAC SDU #2 41b). These MAC SDUs 44 and 46 are attached behind packing subheaders 43 and 46, respectively. Here, the MAC PDU has a MAC header 42 in front and more specifically, in front of the packing subheader 43.

As described above, when the MAC SDU is fragmented or packed, fragmentation subheader or packing subheader is attached to the respective MAC PDU(s). As such, the MAC PDU can be classified in its respective units and according to frame numbers.

In the conventional art, only the methods related to fragmenting and packing are available. In other words, the conventional art does not include a MAC PDU structure having various expanded subheaders.

SUMMARY OF THE INVENTION

Accordingly, the present invention is directed to a method of transmitting feedback information using an extended subheader that substantially obviates one or more problems due to limitations and disadvantages of the related art.

An object of the present invention is to provide a method of transmitting feedback information.

Another object of the present invention is to provide a method of receiving feedback information.

A further object of the present invention is to provide a system for transmitting and receiving feedback information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting feedback information includes a mobile station (MS) which receives from a base station (BS) a Protocol Data Unit (PDU) which includes a Medium Access Channel (MAC) header. Thereafter, the MS determines from the received MAC header whether an extended subheader group appears after the MAC header, and also identifies a feedback request extended subheader from the extended subheader group. Lastly, the MS transmits the feedback information according to the feedback request extended subheader.

In another aspect of the present invention, a method of transmitting feedback information includes a base station (BS) which transmits a Protocol Data Unit (PDU) which includes a Medium Access Channel (MAC) header which indicates an existence of an extended subheader group. Here, the extended subheader group includes a feedback request extended subheader. Thereafter, the BS receives the feedback information transmitted from a mobile station (MS).

Yet in another aspect of the present invention, a system for transmitting and receiving feedback information includes a base station (BS) which transmits a Protocol Data Unit (PDU) which includes a Medium Access Channel (MAC) header which indicates whether an extended subheader group appears after the MAC header. Here, the extended subheader group indicates a feedback request extended subheader. The system also includes a mobile station (MS) which receives the PDU and then determines from the MAC header whether the extended subheader appears after the MAC header. Thereafter, the MS determines from the MAC header whether an extended subheader group appears after the MAC header. Moreover, the MS identifies a feedback request extended subheader from the extended subheader group. Lastly, the MS transmits the feedback information according to the feedback request extended subheader.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
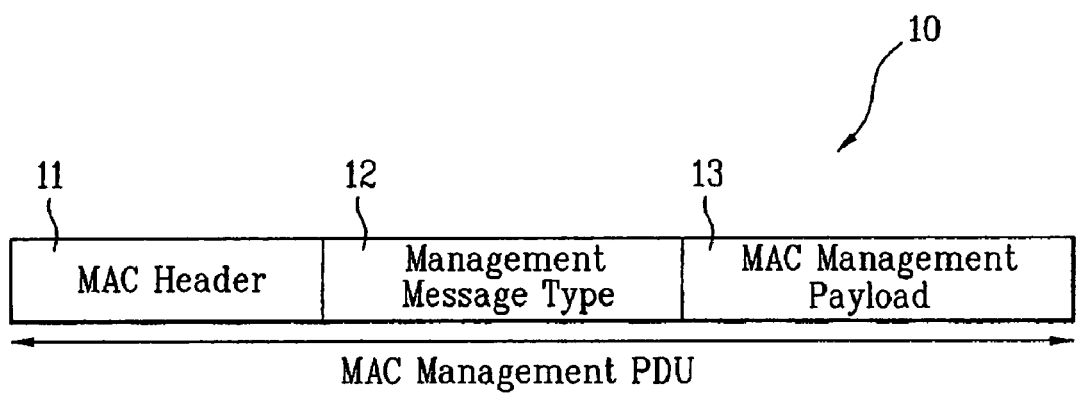
FIG. 1 s an example illustrating a structure of a Medium Access Control (MAC) Protocol Data Unit (PDU)
Figure 2:
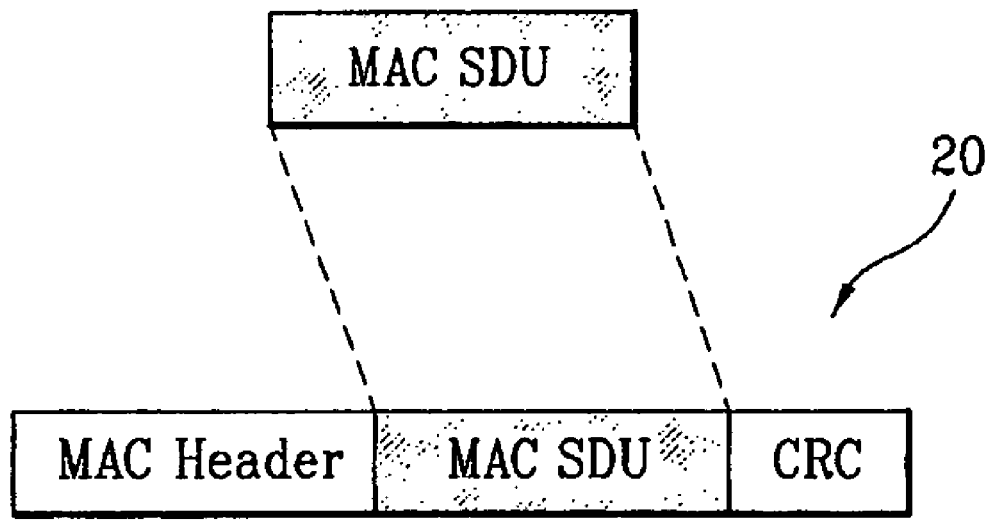
FIG. 2 illustrates a structure of the MAC PDU of FIG. 1.
Figure 3:
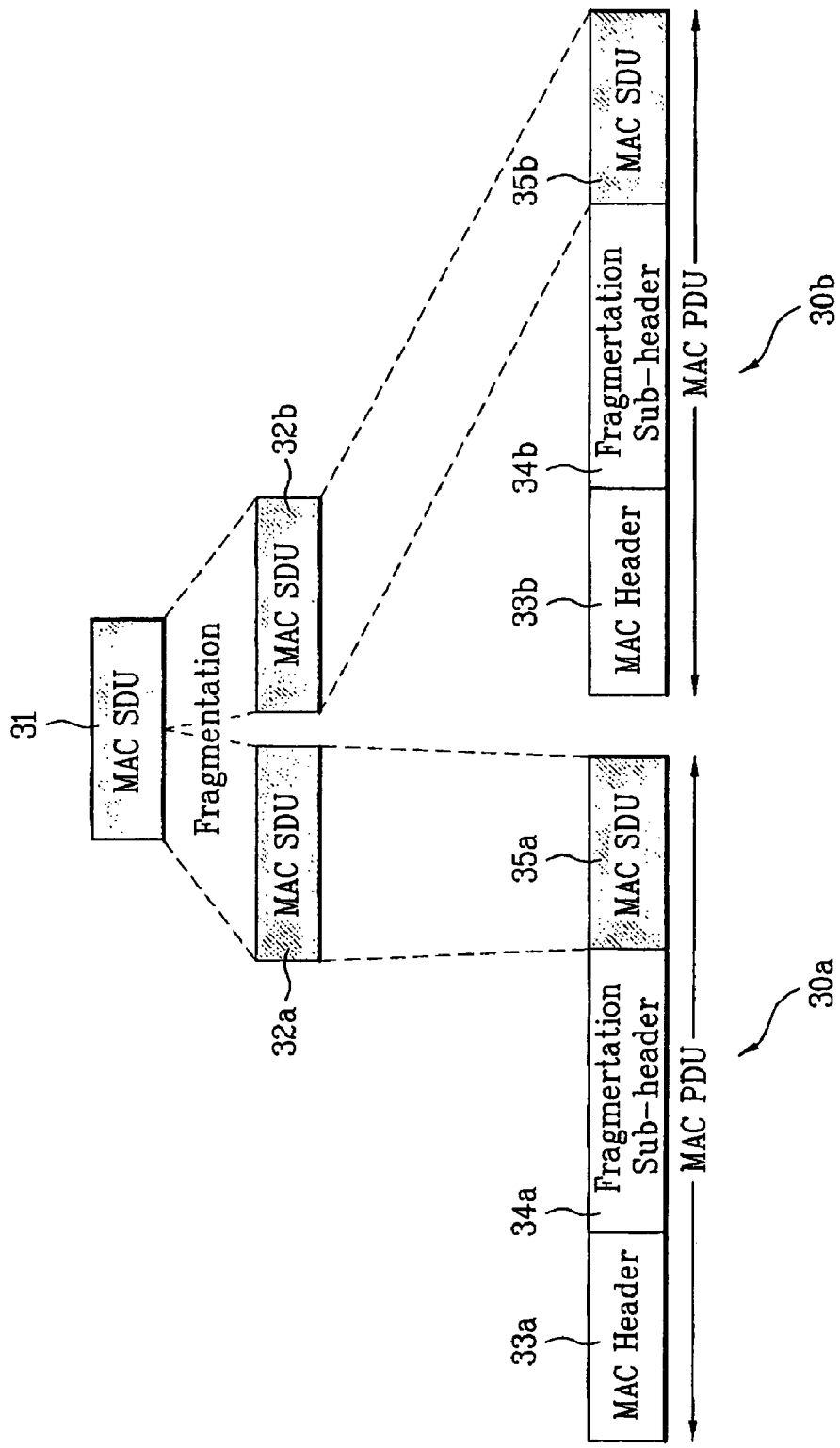
FIG. 3 illustrates another example of a structure of a MAC PDU.
Figure 4:
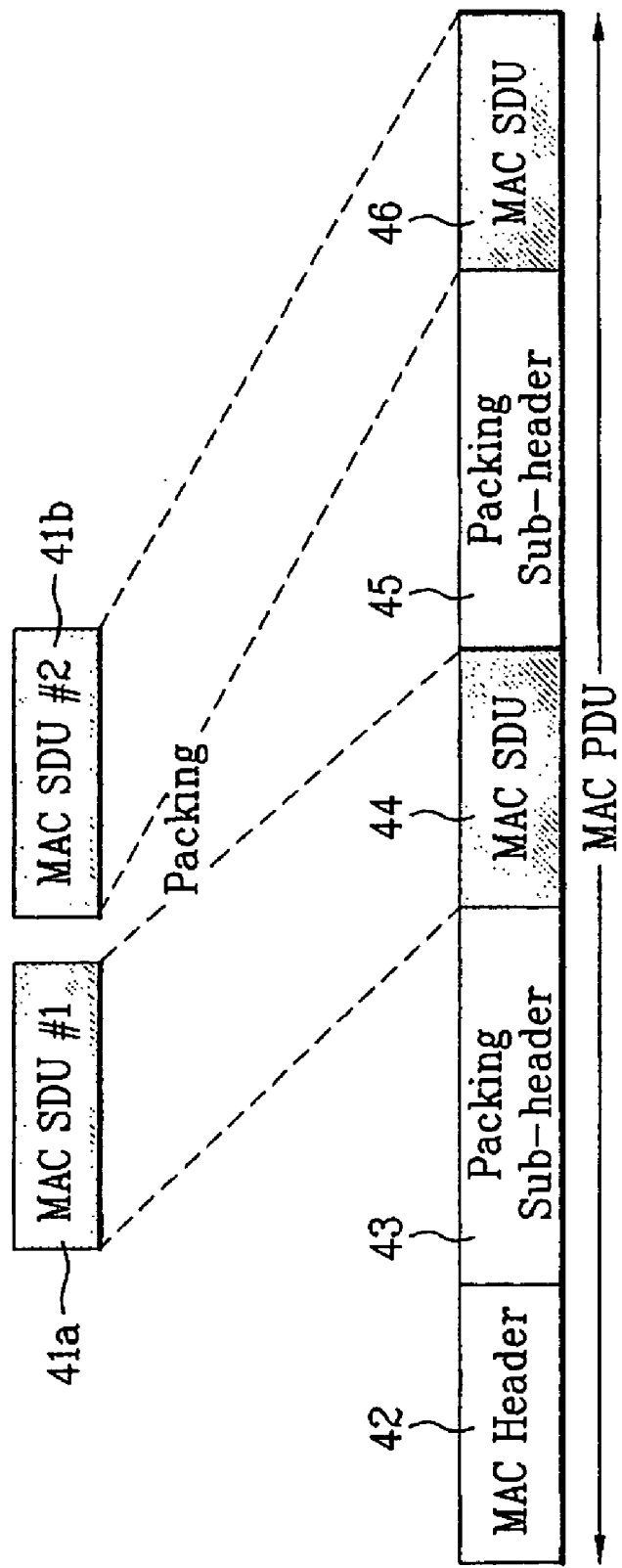
FIG. 4 is yet another example illustrating a structure of a MAC PDU.
Figure 5:
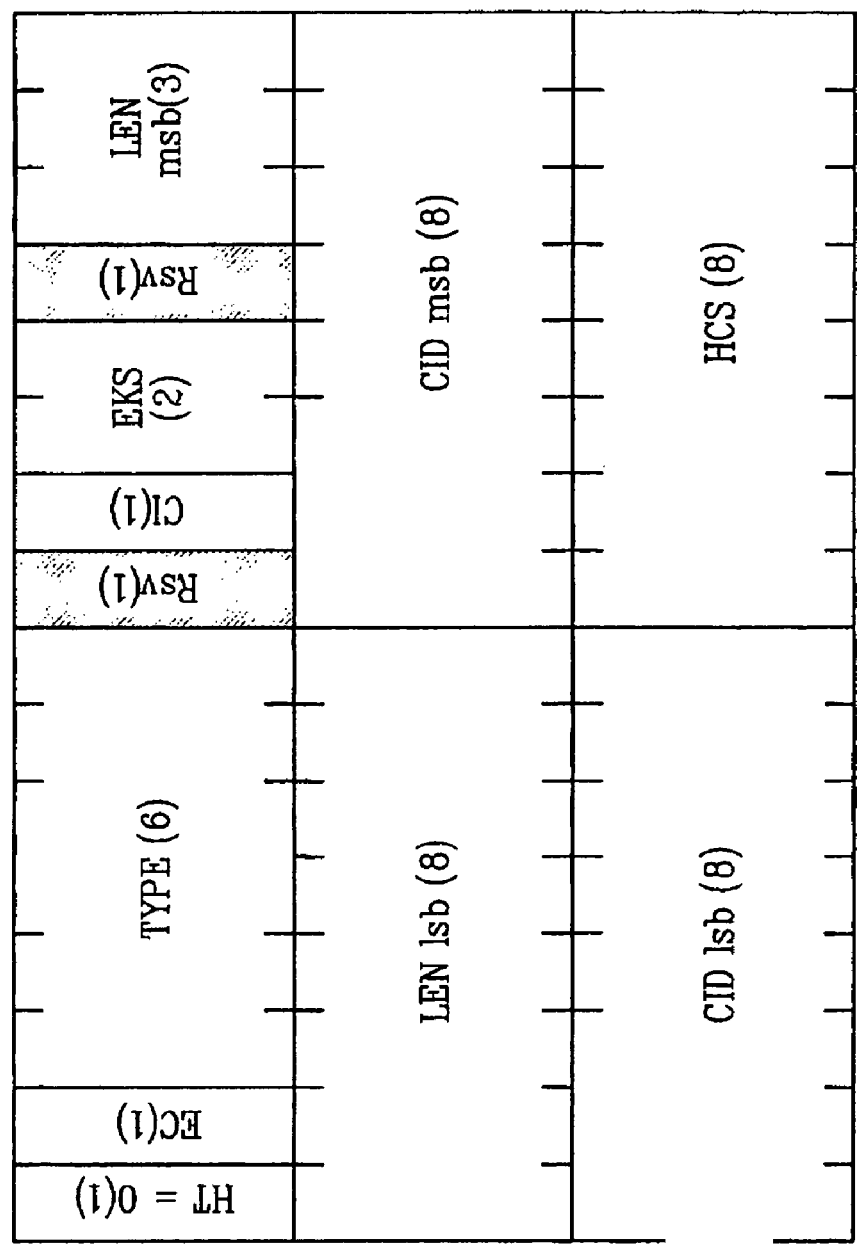
FIG. 5 illustrates an example of a MAC header.

FIG. 5 illustrates an example of a MAC header. As illustrated in FIG. 5, the MAC header includes a 'type' field represented by 6 bits. Moreover, the 'type' field can express six (6) different types of subheaders depending on the bitmap type. These different types of subheaders can be attached behind the MAC header, and a specific type of the subheader can be indicated in the 'type' field. This type field indicates six (6) types of subheaders, and each subheader has a size of 2 bytes.

Table 1 shows an example of six (6) types of subheaders.

TABLE 1

| Type bit | Value |
|---|---|
| #5 Most Significant Bit (MSB) | Mesh subheader<br>1 = present, 0 = absent |
| #4 | ARQ Feedback Payload<br>1 = present, 0 = absent |
| #3 | Extended Type<br>Indicates whether the present Packing or Fragmentation Subheaders, is Extended<br>1 = Extended<br>0 = Not Extended. Applicable to connections where ARQ is not enabled |
| #2 | Fragment subheader<br>1 = present, 0 = absent |
| #1 | Packing subheader<br>1 = present, 0 = absent |
| #0 Least Significant Bit (LSB) | Downlink: FAST-FEEDBACK Allocation subheader<br>Uplink: Grant Management subheader<br>1 = present, 0 = absent |

As shown in Table 1, there are six types of subheaders, represented by a most significant bit (MSB) #5 to a least significant bit (LSB) #0. Each type of subheader can be indicated as being present or as being absent. More specifically, the type bit of '1' or '0' indicates presence or absence of the particular subheader, respectively.

For example, if the 'type' bit #5 is indicated as '1,' the MAC PDU includes a mesh subheader. That is, in a mesh mode, each mobile station (MS) is given a Node identification (Node ID) so that each MS can be identified. To this end, the mesh subheader can be used to provide Node ID to each MS. If the 'type' bit #4 is indicated as 1, then the MAC PDU includes a subheader for an Automatic Repeat Request (ARQ). If the 'type' bit #3 is indicated as 1, then the MAC PDU includes an extended packing subheader or an extended fragmentation subheader. If the 'type' bit #2 and the 'type' bit #1 are each indicated as '1,' a packet PDU corresponding to a user are mapped to a MAC SDU payload. Moreover, a MAC PDU is formed by having a MAC header and a Cyclic Redundancy Check (CRC) attached thereto.

Lastly, an application of the bit of the 'type' bit #0 is different for an uplink transmission and for a downlink transmission. If the 'type' bit #0 is indicated as '1,' the MAC PDU includes a fast-feedback allocation subheader. Here, the fast-feedback allocation subheader is positioned at the end of all subheaders. In order to receive a feedback value from the MS, the fast-feedback allocation subheader is used to allocate resource(s) in a fast feedback channel (e.g., Channel Quality Indication Channel) and the type of feedback information.

An example of a fast-feedback allocation subheader is presented in Table 2.

TABLE 2

| Syntax | Size | Notes |
|---|---|---|
| FAST-FEEDBACK allocation Subheader { | | |
| Allocation offset | 6 bits | |
| Feedback type | 2 bits | 00: Fast DL measurement<br>01: Fast MIMO feedback antenna#0<br>10: Fast MIMO feedback antenna#1<br>11: MIMO mode permutation mode feedback |
| } | | |

As depicted in Table 2, the fast-feedback allocation subheader uses an 'allocation offset' to allocate a Channel Quality Indication Channel (CQICH), which is indicated by a fast feedback channel Information Element (IE), for transmitting feedback information. Here, the allocation of CQICH can be represented in slots. In addition, a type of feedback information can be selected via the 'feedback type.' After the MS receives the fast-feedback allocation subheader, the MS can use the feedback value to request for a change to a Multi Input Multi Output (MIMO) mode or to a permutation mode.

For an uplink, if the 'type' bit #0 is indicated as '1,' the MAC PDU includes a Grant Management subheader. The Grant Management subheader is used to deliver information related to managing the uplink resources. Moreover, the use of the Grant Management subheader can vary depending on a subheader type. Based on the type of service, an allocation request for bandwidth using a piggyback request, bandwidth stealing scheme, and a polling scheme.

As illustrated in FIG. 5, the MAC header includes two reserved bits, each having 1 bit length. Here, any one of the two reserved bits can be used to include information of an enhanced fast-feedback allocation subheader. In other words, a reserved bit can be used to indicate whether an enhanced fast-feedback allocation subheader is attached.

If the reserved bit is indicated as 1, the MAC header includes information of existence of the enhanced fast-feedback allocation subheader, and alternatively, if the reserved bit is indicated as '0,' the MAC header does not include any information on the enhanced fast-feedback allocation subheader.

Table 3 shows an example of an enhanced fast-feedback allocation subheader.

TABLE 3

| Syntax | Size (bits) | Notes |
|---|---|---|
| Enhanced Fast-feedback allocation subheader{ | | |
| Allocation type | 1 | 0 = Use Fast-Feedback channel 1 = Use Feedback MAC header |
| If allocation type == 0 { | | |
| Allocation offset | 6 | Represented in slots, starting frame offset value for Fast-Feedback channel |
| CQICH_num | 4 | Number of CQICH slot(s) to be used |
| Feedback type | 3 | #0 least significant bit(LSB) ? Fast DL measurement #1 - Fast MIMO feedback, antenna #0 #2 - Fast MIMO feedback, antenna #1 #3 - Fast MIMO feedback, antenna #2 #4 - Fast MIMO feedback, antenna #3 #5 - MIMO mode and Permutation mode feedback #6-#8 reserved |
| Frame offset | 2 | BS indicates starting frame |
| } else { | | |
| UIUC | 4 | |
| Duration | 4 | MS indicates starting frame |
| Feedback type | 4 | Refer to Table 4 |
| Frame offset | 3 | |
| } | | |

According to Table 3, the enhanced fast-feedback allocation subheader transmits a data packet to the MS. In addition, the enhanced fast-feedback allocation subheader requests for feedback on information pertaining to the transmission channel and weight value(s) of the antennas. Here, additional information can be requested such as a method of transmitting the feedback information.

In Table 3, an 'allocation type' field can be used to select a method of transmitting feedback information. For example, if the 'allocation type' field is indicated by '0,' the MS uses the fast feedback channel to transmit the feedback information. In such a case, an 'allocation offset' field is used to indicate the location of the fast feedback channel, and a 'CQICH_num' field is used to determine a number of slots to be used transmit the feedback information.

Moreover, a 'feedback type' field is used to indicate the contents of the feedback information. For example, if a BS uses two antennas, the BS can request for weight values corresponding to a first antenna and a second antenna while allocating two slots. Then the MS can send the weight value for the first antenna and the weight value for the second antenna using the allocated slots.

Furthermore, a 'frame offset' field can be used to provide information as to when the MS should send the feedback information. That is, after the MS receives the subheader, the MS can send the feedback information after a specified period or after a specified number of frames.

Alternatively, if the 'allocation type' field is indicated by '1,' the MS uses the MAC header to transmit the feedback information. Here, a 'duration' field is used to provided information regarding allocated wireless resource in the uplink, and a 'feedback type' is used to indicate the type of feedback information.

Table 4 is an example illustrating feedback information corresponding to 'feedback type' field value.

TABLE 4

| Feedback Type | Feedback contents | Description |
|---|---|---|
| 0b0000 | Set as described in table 296d | MIMO mode and permutation feedback |
| 0b0001 | DL average CQI (5 bits) | 5 bits CQI feedback |
| 0b0010 | Number of index L(2 bits) + MIMO coefficient (5 bits. 8.4.5.4.10.6) | MIMO coefficients feedback |
| 0b0011 | Preferred-DIUC(4 bits) | Preferred DL channel DIUC feedback |
| 0b0100 | UL-TX-Power(7 bits) | UL transmission power |
| 0b0101 | Preferred DIUC(4 bits) + UL-TX-Power(7 bits) + UL-headroom(6 bits) | PHY channel feedback |
| 0b0110 | Number of bands, N(2 bits) + N occurrences of 'band index(6 bits) + CQI (5 bits) | CQIs of multiple AMC bands |
| 0b0111 | Number of feedback types, 0(2 bits) + O occurrences of 'feedback type(4 bits) + feedback content (variable)' | Multiple types of feedback |
| 0b1000- 0b1111 | Reserved for future use | |

As described above, if the 'allocation type' field is indicated by '1,' the MS receives the enhanced fast-feedback allocation subheader and uses the allocated uplink wireless resources to transmit the feedback information via the MAC header.

Figure 6:
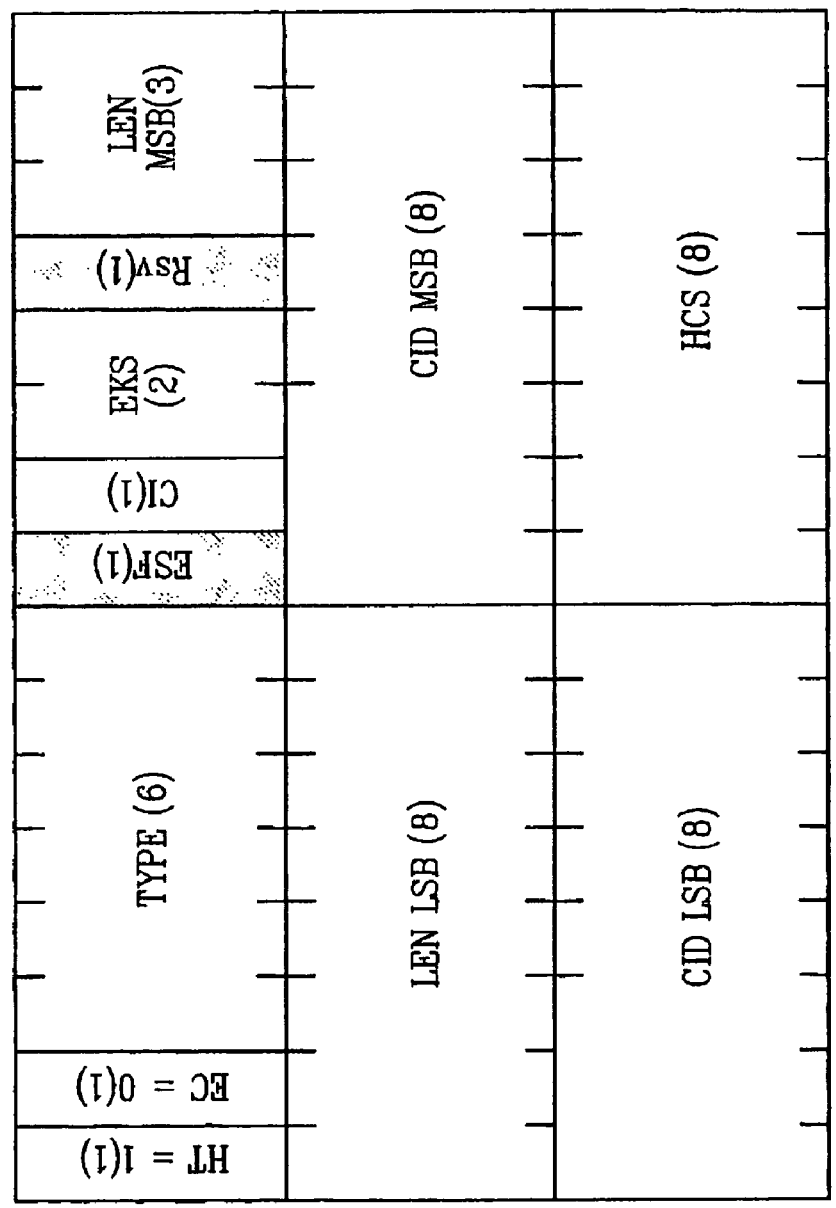
FIG. 6 is another example illustrating a MAC header.

FIG. 6 is another example illustrating a MAC header. As illustrated in FIG. 6, the MAC header includes an Extended Subheader Format (ESF) field to further express an extended subheader group. That is, if the ESF field value is set to '1,' an extended subheader group is provided between the MAC header and six types of subheaders (immediately after the MAC header), which is expressed via a 'type' field. Alternatively, the extended subheader group can appear between the subheaders and a payload. Hereafter, a term 'extended subheader' may be used interchangeably as a term 'extended subheader group.'

Figure 7:
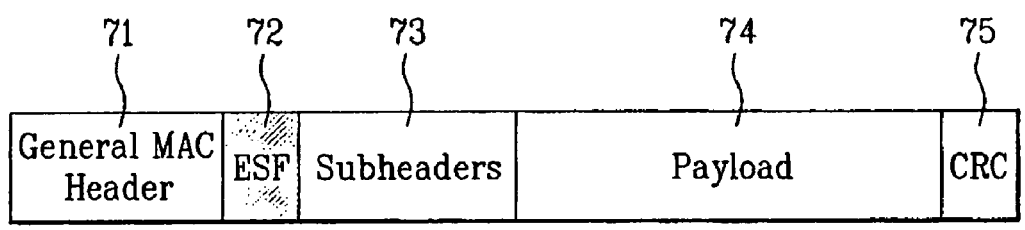
FIG. 7 depicts an example of a MAC PDU.

FIG. 7 depicts an example of a MAC PDU. As show in this figure, the MAC PDU includes a MAC header 71, an ESF 72, subheaders 73, a payload 74, and a CRC 75. The ESF 72 can be located between the MAC header 71 and the subheaders 73, and the length of the ESF 72 can be determined based on a number of attached subheaders. Alternatively, the ESF 72 can appear or attached behind the subheaders 73.

The BS can set the value of the ESF field as '1' in the MAC header so that the MS can be notified as to the existence of the ESF between the MAC header and the subheaders. Furthermore, the ESF should not be encrypted; however, the MS can perform the error detection operation by using the CRC located at the end of the PDU.

Figure 8:
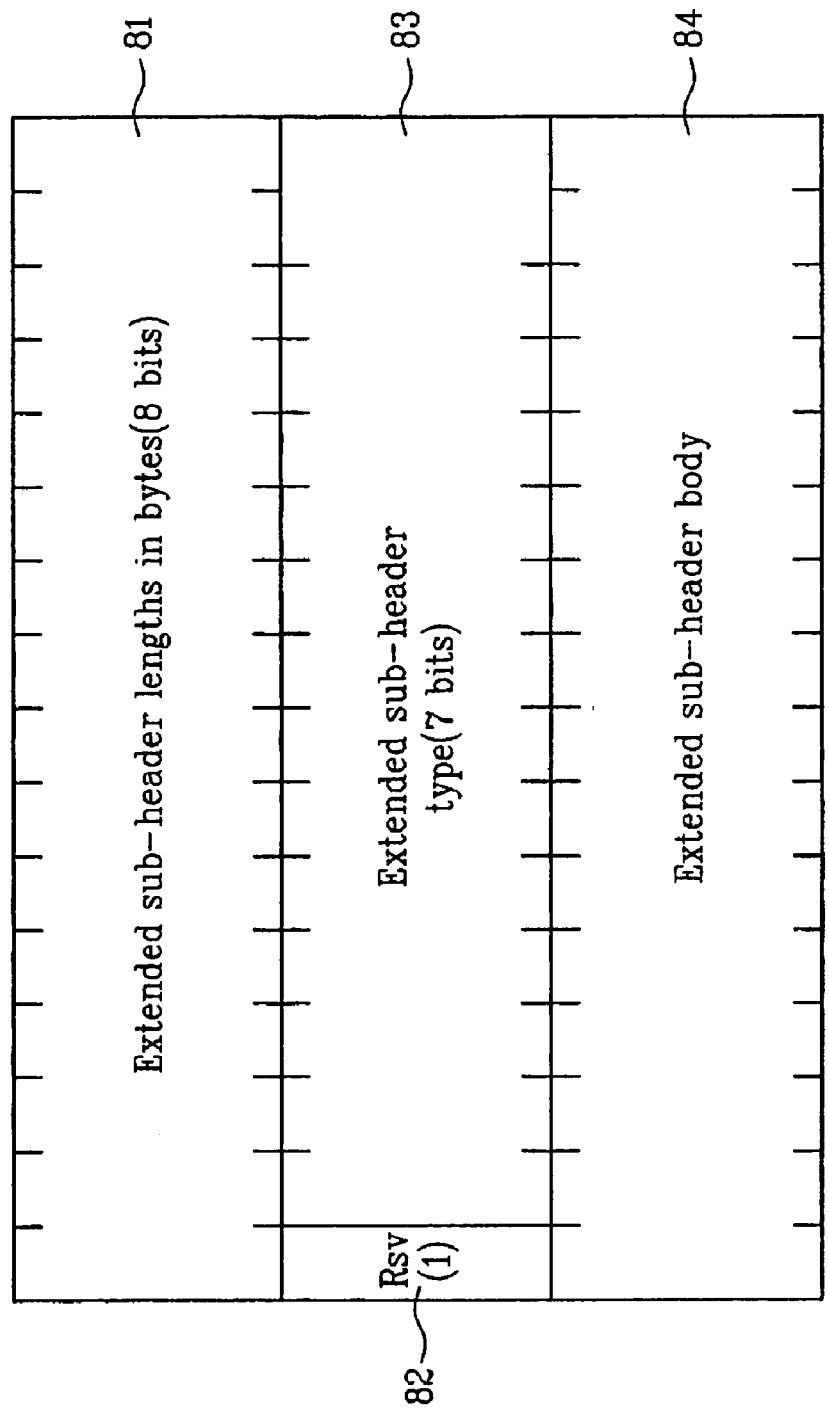
FIG. 8 is a diagram depicting a structure of an extended subheader group.

FIG. 8 is a diagram depicting a structure of an extended subheader group. As depicted in FIG. 8, the extended subheader group consists of an extended subheader lengths field 81 for providing a total length of the extended subheader group, a reserved bit field 82, an extended subheader type field 83, and an extended subheader body 84. Preferably, the extended subheader lengths field should be represented in 8 bits, and the total length of the extended subheader is represented in bytes. Here, the total length can be represented by maximum of $2^7$ bytes. Furthermore, there can be up to 128 types of extended subheaders.

Table 5 is an example of an extended subheader types.

TABLE 5

| ESF Type value | Name | Length (bytes) |
|---|---|---|
| 0 | New Extended subheader_1 | 1 |
| 1 | New Extended subheader_2 | 2 |
| Bits 2-127 | Reserved | |

Here, Table 5 illustrates addition of two extended subheaders. That is, based on the extended subheader type field 83, a type corresponding to '0' has an extended subheader_1 having a length of one (1) byte while a type corresponding to '1' has an extended subheader_2 having a length of two (2) bytes. Depending on the type, the extended subheader can be classified into whether the subheader is for uplink or downlink transmission. For example, a subheader used in the uplink is formed at the MS and transmitted to the BS, and if the MS receives this subheader, the MS disregards it.

Figure 9:
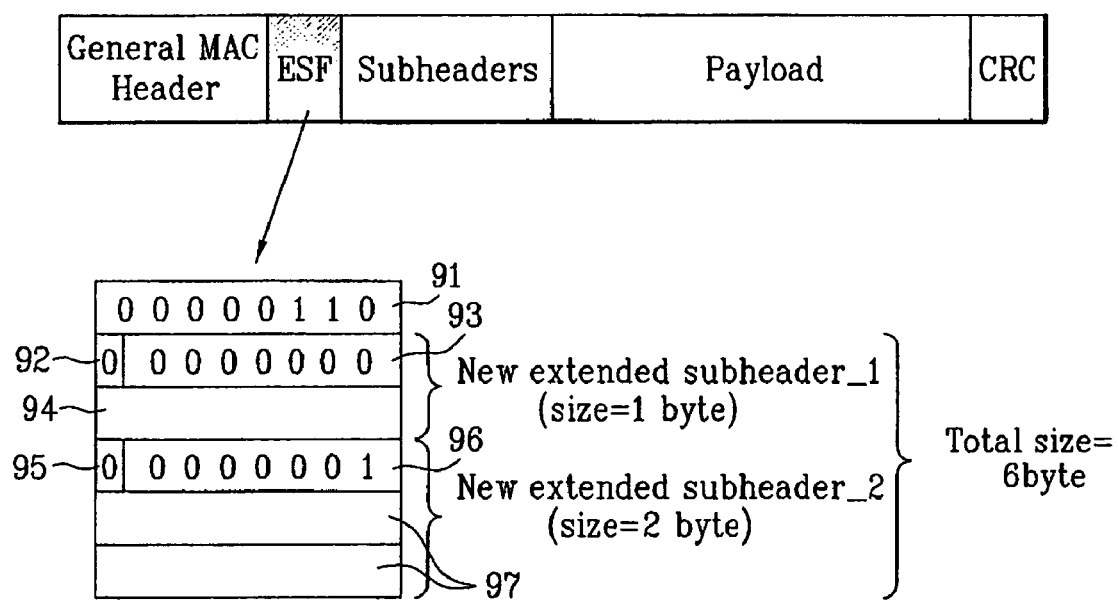
FIG. 9 is an example of an Extended Subheader Format (ESF).

FIG. 9 is an example of a format of an ESF. Here, refer to FIGS. 7 and 8 as well as Table 2. In FIG. 9, the MAC PDU includes the extended subheader group, and an extended subheader length field 91 is used to indicate a total length of the subheader(s). In this figure, the total length of the subheaders is six (6) bytes.

In detail, a new extended subheader_1 includes a reserved bit 92 and an extended subheader type 93. Here, the extended subheader type is '0' and has a length equaling 1 byte. Moreover, a body 94 of the extended subheader contains information of a subheader represented by type '0' and having a length of 1 byte.

Furthermore, a new extended subheader_2 includes a reserved bit 95 and an extended subheader type 97. Here, the extended subheader type is '1' and has a length of 2 bytes. In a body 97 of the extended subheader_2, different from the new extended subheader_1, there are two subheaders having the length of 2 bytes.

Table 6 is an example of a downlink extended subheader attached to the MAC PDU.

TABLE 6

| ESF Type value | Name | Length |
|---|---|---|
| 0 | SDU_SN Extended subheader | 1 |
| 1 | DL Sleep control Extended subheader | 3 |
| 2 | Feedback request Extended subheader | 3 |
| 3 | PDU SN(short) Extended subheader | 1 |
| 4 | PDU SN(long) Extended subheader | 2 |
| Bits#5-127 | Reserved | |

As shown in Table 6, at least one subheader is attached to the MAC PDU before being transmitted. For example, if the ESF type field indicates a value of '00000010, 'a feedback request extended subheader, having a length of 3 bits, is attached to Table 7 is another example of an uplink extended subheader group attached to the MAC PDU.

TABLE 7

| ESF Type value | Name | Length |
|---|---|---|
| 0 | MIMO mode feedback Extended subheader | 1 |
| 1 | UL Tx power report Extended subheader | 1 |
| 2 | Mini-Feedback report Extended subheader | 2 |

TABLE 7-continued

| ESF Type value | Name | Length |
|---|---|---|
| 3 | PDU SN(short) Extended Extended subheader | 1 |
| 4 | PDU SN(long) Extended subheader | 2 |
| Bits#5-127 | Reserved | |

As shown in Table 7, at least one subheader is attached to the MAC PDU before being transmitted. For example, if there is a request for MIMO mode change, a MIMO mode feedback extended subheader is transmitted after a desired mode is selected.

Table 8 is an example of a feedback request extended subheader format from an uplink extended subheader.

TABLE 8

| Name | Size (bits) | Description |
|---|---|---|
| UIUC | 4 | |
| Feedback type | 4 | Refer to Table 4 |
| OFDMA Symbol offset | 6 | The offset is relevance to the Allocation Start Time field given in the UL-MAP message. |
| Subchannel offset | 6 | The lowest index subchannel used for carrying the burst, starting from Subchannel 0. |
| No. slot | 3 | The number of slots allocated for the burst |
| Frame offset(F) | 1 | Indicate to start reporting at the frame. If F == 0, the allocation applies to the UL subframe two frames ahead of the current frame. If F == 1, for frames ahead of the current frame. |

As depicted in Table 8, a feedback request extended subheader format can be 3 bytes in length. If the feedback request extended subheader format is transmitted to the MS, the MS transmits feedback information according to the contents of the feedback request extended subheader using the allocated uplink wireless resource. In addition, an 'OFDMA symbol offset' field and a 'subchannel offset' field provide a location of the uplink resource for feedback information. Moreover, a 'No. slot' field indicates a number of slots allocated for the burst or a number slots to be used from a designated location. Here, a method of encoding for the feedback information is determined using an Uplink Interval Usage Code (UIUC). Lastly, a 'frame offset' field provides a starting frame for transmitting feedback information, where the starting frame is a frame at which the feedback information is to be begin transmitting.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving an extended subheader, the method comprising:
    receiving a Protocol Data Unit (PDU) which includes a Medium Access Channel (MAC) header;
    determining from the MAC header whether an extended subheader group appears immediately after the MAC header and before all subheaders, wherein the extended subheader group includes at least one of an SDU_SN extended subheader, a DL sleep control extended subheader, a feedback request extended subheader, a PDU SN(short) extended subheader or a PDU SN(long) extended subheader; and identifying at least one of the extended subheaders from the extended subheader group.

2. The method of claim 1, wherein the extended subheaders are received without encryption.

3. The method of claim 1, wherein the existence of the extended subheader group is indicated by an Extended Subheader Format (ESF) field which is included in the MAC header.

4. The method of claim 3, wherein a size of the ESF field is 1 bit.

5. The method of claim 1, wherein the extended subheader group includes an extended subheader group length, at least one extended subheader type, and at least one extended subheader body.

6. The method of claim 5, wherein the extended subheader group length indicates a total length of the extended subheader group.

7. The method of claim 5, wherein the extended subheader type indicates various types of extended subheaders and a length of a corresponding extended subheader.

8. The method of claim 5, wherein the extended subheader body includes contents of each extended subheader.

9. The method of claim 8, wherein a size of the extended subheader body depends on the contents of the extended subheader.

10. The method of claim 1, wherein the feedback request extended subheader includes a feedback type, frame offset, subchannel offset, an Orthogonal Frequency Division Multiplexing Access (OFDMA) symbol offset, an Uplink Interval Usage Code (UIUC), and a number of slots.

11. The method of claim 10, wherein the feedback type includes at least one of downlink average carrier to interference and noise ratio (CINR) and preferred Downlink Interval Usage Code (DIUC).

12. The method of claim 10, wherein the frame offset indicates a starting frame for transmitting feedback information, the starting frame is a frame at which the feedback information is to be transmitted.

13. The method of claim 1, wherein the feedback information is transmitted via a feedback MAC header.

14. The method of claim 1, wherein the feedback request extended subheader further includes an allocation type.

15. The method of claim 14, wherein the allocation type indicates transmitting the feedback information using a fast-feedback channel or a feedback MAC header.

16. The method of claim 15, wherein the feedback information is transmitted via the fast-feedback channel.

17. A method of transmitting an extended subheader, the method comprising:

transmitting a Protocol Data Unit (PDU) which includes a Medium Access Channel (MAC) header which indicates whether an extended subheader group appears immediately after the MAC header and before all subheaders, wherein the extended subheader group includes at least one of an SDU_SN extended subheader, a DL sleep control extended subheader, a feedback request extended subheader, a PDU SN(short) extended subheader or a PDU SN(long) extended subheader.

18. The method of claim 17, wherein the existence of the extended subheader group is indicated by an Extended Subheader Format (ESF) field which is included in the MAC header.

19. The method of claim 18, wherein a size of the ESF field is 1 bit.

20. The method of claim 17, wherein the extended subheader group includes an extended subheader group length, at least one extended subheader type, and at least one extended subheader body.

21. The method of claim 17, wherein the feedback request extended subheader includes a feedback type, frame offset, subchannel offset, an Orthogonal Frequency Division Multiplexing Access (OFDMA) symbol offset, an Uplink Interval Usage Code (UIUC), and a number of slots.

22. A system for transmitting and receiving and extended subheader, the system comprising:

a base station (BS) for:

transmitting a Protocol Data Unit (PDU) which includes a Medium Access Channel (MAC) header which indicates whether an extended subheader group appears immediately after the MAC header and before all subheaders, wherein the extended subheader group includes at least one of an SDU_SN extended subheader, a DL sleep control extended subheader, a feedback request extended subheader, a PDU SN(short) extended subheader or a PDU SN(long) extended subheader; and a mobile station (MS) for:

receiving a Protocol Data Unit (PDU) which includes a Medium Access Channel (MAC) header, determining from the MAC header whether an extended subheader group appears immediately after the MAC header and before all subheaders, wherein the extended subheader group includes at least one of an SDU_SN extended subheader, a DL sleep control extended subheader, a feedback request extended subheader, a PDU SN(short) extended subheader or a PDU SN(long) extended subheader, and identifying at least one of the extended subheaders from the extended subheader group.

* * * * *